(12) United States Patent
Lee et al.

(10) Patent No.: US 11,314,128 B2
(45) Date of Patent: Apr. 26, 2022

(54) DIFFUSION SHEET AND A BACKLIGHT UNIT INCLUDING THE DIFFUSION SHEET

(71) Applicant: LMS Co., Ltd., Pyeongtaek-si (KR)

(72) Inventors: Taejun Lee, Pyeongtaek-si (KR); Kiwook Yi, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 175 days.

(21) Appl. No.: 16/686,784

(22) Filed: Nov. 18, 2019

(65) Prior Publication Data

US 2020/0159072 A1    May 21, 2020

(30) Foreign Application Priority Data

Nov. 16, 2018 (KR) .................. 10-2018-0141374

(51) Int. Cl.
*G02B 5/02* (2006.01)
*G02F 1/13357* (2006.01)
*G02F 1/1335* (2006.01)

(52) U.S. Cl.
CPC .. *G02F 1/133606* (2013.01); *G02F 1/133512* (2013.01)

(58) Field of Classification Search
CPC ......... G02F 1/133606; G02F 1/133512; G02F 1/133611; G02F 1/133615; G02B 5/02; G02B 5/0205; G02B 5/021; G02B 5/0215; G02B 5/0221; G02B 5/0226; G02B 5/0236; G02B 5/0242; G02B 5/0273; G02B 5/0278; G02B 5/0294; G02B 6/0025; G02B 6/0051

USPC .............. 359/599, 601, 609; 362/600, 608
See application file for complete search history.

(56) References Cited

U.S. PATENT DOCUMENTS

| | | | |
|---|---|---|---|
| 2007/0134438 A1 | 6/2007 | Fabick et al. | |
| 2009/0154157 A1* | 6/2009 | Sah | G02B 5/0231 362/235 |
| 2010/0271840 A1* | 10/2010 | Hamada | G02B 5/0242 362/606 |
| 2011/0003465 A1 | 1/2011 | Scardera et al. | |
| 2014/0340911 A1 | 11/2014 | Woo et al. | |
| 2016/0334564 A1 | 11/2016 | Cho et al. | |
| 2017/0153362 A1 | 6/2017 | Cho et al. | |
| 2017/0153363 A1* | 6/2017 | Lee | G02F 1/133606 |
| 2018/0120626 A1* | 5/2018 | Min | G02F 1/133504 |
| 2020/0116919 A1* | 4/2020 | Lee | G02B 5/0221 |

FOREIGN PATENT DOCUMENTS

| | | |
|---|---|---|
| CN | 105874359 A | 8/2016 |
| CN | 106814496 A | 6/2017 |
| CN | 106814504 A | 6/2017 |
| JP | 2002513165 A | 5/2002 |

(Continued)

OTHER PUBLICATIONS

Korean Office Action dated Jul. 21, 2020 in connection with the Korean Patent Application No. 10-2018-0141374.

(Continued)

*Primary Examiner* — Arnel C Lavarias
(74) *Attorney, Agent, or Firm* — Hauptman Ham, LLP

(57) ABSTRACT

A diffusion sheet includes a first base film, a second base film, and a shielding layer placed between the first base film and the second base film. In this case, the shielding layer includes an air gap and a pattern.

10 Claims, 8 Drawing Sheets

(56) References Cited

FOREIGN PATENT DOCUMENTS

| KR | 2003-0097143 A | 12/2003 |
|---|---|---|
| KR | 10-2008-0081904 A | 9/2008 |
| KR | 10-2012-0117901 A | 10/2012 |
| KR | 10-2014-0135590 A | 11/2014 |
| KR | 101525535 B1 | 6/2015 |
| KR | 10-2016-0143079 A | 12/2016 |
| KR | 10-2018-0012137 A | 2/2018 |

OTHER PUBLICATIONS

Korean Notice of Allowance dated Feb. 19, 2021, in connection with corresponding Korean Patent Application No. 10-2018-0141374.
Korean Office Action dated Nov. 20, 2019, in connection with the Korean Patent Application No. 10-2018-0141374.
Office Action dated Feb. 25, 2022, for corresponding Chinese patent application No. 201911076773.7.

\* cited by examiner

| 80nm | | | | | | | |
|---|---|---|---|---|---|---|---|
| Content(%) | 10 | 20 | 30 | 35 | 40 | 45 | 60 |
| Haze(%) | 97.76 | 97.81 | 97.77 | 97.8 | 97.82 | 98.04 | 98.11 |
| TT(%) | 83.28 | 81.17 | 80.26 | 79.25 | 79.11 | 78.95 | 78.58 |

| | 250nm | | | | |
|---|---|---|---|---|---|
| Content(%) | 10 | 20 | 30 | 40 | 50 |
| Haze(%) | 97.71 | 97.69 | 98.22 | 98.18 | 98.3 |
| TT(%) | 83.97 | 82.52 | 78.54 | 78.13 | 78.91 |

| | 500nm | | | | |
|---|---|---|---|---|---|
| Content(%) | 10 | 20 | 30 | 40 | 50 |
| Haze(%) | 97.71 | 98.17 | 98.49 | 98.33 | 98.55 |
| TT(%) | 81.22 | 79.98 | 77.45 | 77.13 | 77.61 |

| 250nm | | | | | | | |
|---|---|---|---|---|---|---|---|
| Content(%) | 3 | 5 | 7 | 10 | 15 | 20 | 25 |
| Haze(%) | 98.11 | 98.16 | 98.19 | 98.22 | 98.55 | 98.77 | 99.02 |
| TT(%) | 76.93 | 76.27 | 75.27 | 74.93 | 73.21 | 71.13 | 69.79 |
| Adhesion(kgf) | 0.05 | 0.04 | 0.031 | 0.02 | 0.013 | 0.007 | - |

|  | 1310 Prior art | 1320 Various embodiments of the present invention | |
|---|---|---|---|
| Fabric | 32um transparent PET (internal beads) | 16um transparent PET (two-sheet bonds) | |
| Shielding layer | None | First shielding layer | First shielding layer and second shielding layer |
| Material | Dispersion resin | Dispersion adhesive and dispersion resin | |
| Hz | 98.69% | 98.09% | 98.19% |
| TT | 69.03% | 84.35% | 75.57% |
| Brightness | 95.60% | 97.00% | 98.60% |
| Color coordinates | 0.0041 | 0.0024 | 0.0025 |
|  |  |  |  |

DIFFUSION SHEET AND A BACKLIGHT UNIT INCLUDING THE DIFFUSION SHEET

CROSS REFERENCE TO RELATED APPLICATION

This application claims priority under 35 U.S.C. 119 to Korean Patent Application No. 10-2018-0141374, filed on Nov. 16, 2018, which is hereby incorporated by reference in its entirety.

BACKGROUND

Technical Field

The present invention relates to a diffusion sheet and a backlight unit comprising the diffusion sheet, more particularly a diffusion sheet improving its shielding performance and a backlight unit comprising the diffusion sheet.

Description of Related Art

In general, a liquid crystal display (LCD) includes a backlight module to uniformly distribute light over the entire panel. The backlight module includes a lamp, a lamp reflector for reflecting the light and a light guide plate to transform the reflected light to a surface light source.

An optical film including a diffusion sheet for uniformly diffusing light and a prism sheet for condensing the diffusion light is placed on an upper surface of the light guide plate.

The diffusion sheet requires shielding performance. Foreign substances generated during the assembly of the light guide plate or the backlight module may be recognized by the user, which may reduce the user satisfaction. Therefore, securing the shielding performance of the diffusion sheet is an essential condition for increasing the completeness of the backlight module.

In general, a high shielding diffusion sheet in which beads are added to the base film for the diffusion sheet to improve the shielding performance of the diffusion sheet is used. However, the high shielding diffusion sheet has a problem that the brightness of the light is lowered due to the added beads. Accordingly, there is a need for research on a new type of diffusion sheet to secure shielding effect.

SUMMARY

The present invention provides a diffusion sheet and a backlight unit including the same, which effectively arranges patterns and beads among a plurality of base films to secure shielding performance while minimizing a decrease in luminance of light.

The object of the present invention is to provide a diffusion sheet comprising a first base film, a second base film and a first shielding layer which is placed between the first base film and the second base film, wherein the first shielding layer includes an air gap and a pattern.

Another object of the present invention is to provide a diffusion sheet comprising a first base film, a second base film and a first shielding layer which is placed between the first base film and the second base film, wherein the first shielding layer includes an air gap and a pattern and further includes first beads.

Still another object of the present invention is to provide a diffusion sheet comprising a first base film, a second base film and a first shielding layer which is placed between the first base film and the second base film, wherein the first shielding layer includes an air gap and a pattern, and wherein the diffusion sheet further comprises a patterned diffusion layer formed at least one side of the first base or the second base film.

The object of the present invention is further to provide a diffusion sheet comprising a first base film, a second base film and a first shielding layer which is placed between the first base film and the second base film, wherein the first shielding layer includes an air gap and a pattern, and wherein the diffusion sheet further comprises a first patterned diffusion layer formed one side of the first base film and a second patterned diffusion layer formed one side of the second base film.

Yet, the object of the present invention is to provide a diffusion sheet comprising a first base film, a second base film and a first shielding layer which is placed between the first base film and the second base film, wherein the first shielding layer includes an air gap and a pattern, wherein the diffusion sheet comprises a patterned diffusion layer formed at least one side of the first base or said second base film, and wherein the patterned diffusion layer includes the second beads.

Still another object of the present invention is to provide a diffusion sheet comprising a first base film, a second base film and a first shielding layer which is placed between the first base film and the second base film, wherein the first shielding layer includes an air gap and a pattern, wherein the first shielding layer further includes a first beads, and wherein a characteristic of the first beads is determined by at least one value based on a haze value as to the diffusion sheet, a transmittance of the diffusion sheet, or an adhesion of the first shielding layer.

Yet, still the object of the present invention is to provide a diffusion sheet comprising a first base film, a second base film and a first shielding layer which is placed between the first base film and the second base film, wherein the first shielding layer includes an air gap and a pattern, wherein the diffusion sheet comprises a patterned diffusion layer formed at least one side of the first base or said second base film, and wherein the patterned diffusion layer includes the second beads, and wherein a characteristic of the second beads is determined by at least one value based on a haze value as to the diffusion sheet or a transmittance of the diffusion sheet.

The object of the present invention is also to provide a diffusion sheet comprising a first base film, a second base film and a first shielding layer which is placed between the first base film and the second base film, wherein the first shielding layer includes an air gap and a pattern, and wherein the diffusion sheet further comprises a second shielding layer formed between the first and the second base film.

The object of the present invention is also to provide a diffusion sheet comprising a first base film, a second base film and a first shielding layer which is placed between the first base film and the second base film, wherein the first shielding layer includes an air gap and a pattern, wherein the diffusion sheet further comprises a second shielding layer formed between the first base film and the second base film, and wherein the second shielding layer is formed one side of the first shielding layer.

The object of the present invention is also to provide a diffusion sheet comprising a first base film, a second base film and a first shielding layer which is placed between the first base film and the second base film, wherein the first shielding layer includes an air gap and a pattern, wherein the diffusion sheet further comprises a second shielding layer formed between the first base film and the second base film, and wherein the second shielding layer includes a first protrusion portion and a second protrusion portion, wherein each the first protrusion and the second protrusion has a different height.

Another object of the present invention is also to provide a diffusion sheet comprising a first base film, a second base film and a first shielding layer which is placed between the first base film and the second base film, wherein the first shielding layer includes an air gap and a pattern, wherein the diffusion sheet further comprises a second shielding layer formed between the first base film and the second base film, wherein the second shielding layer includes a first protrusion portion and a second protrusion portion, wherein each the first protrusion and the second protrusion has a different height, and wherein a height of the first protrusion is larger than a height of the second protrusion to provide a contact with the first shielding layer and the second shielding layer.

The object of the present invention is also to provide a diffusion sheet comprising a first base film, a second base film and a first shielding layer which is placed between the first base film and the second base film, wherein the first shielding layer includes an air gap and a pattern, and wherein a thickness of the diffusion sheet is between 32 μm and 36 μm.

The object of the present invention is further to provide a backlight unit comprising a diffusion sheet including a first base film, a second base film and a first shielding layer which is placed between the first base film and the second base film, wherein the first shielding layer includes an air gap and a pattern.

According to the present invention, the diffusion sheet may effectively reduce the brightness of light while ensuring shielding performance by effectively disposing patterns and beads among the plurality of base films.

DETAILED DESCRIPTION

The operation principle of the preferred embodiment of the present invention will be described in detail with reference to the accompanying drawings. In addition, in describing the exemplary embodiment of the present invention, when it is determined that a detailed description of a related known function or configuration may obscure the subject matter of the present disclosure, the detailed description will be omitted. The terms used below are terms defined in consideration of functions in the present invention, which may vary according to intentions or customs of users or operators. Therefore, the definitions of the terms used should be interpreted based on the contents throughout the present specification and the corresponding functions.

Figure 1:
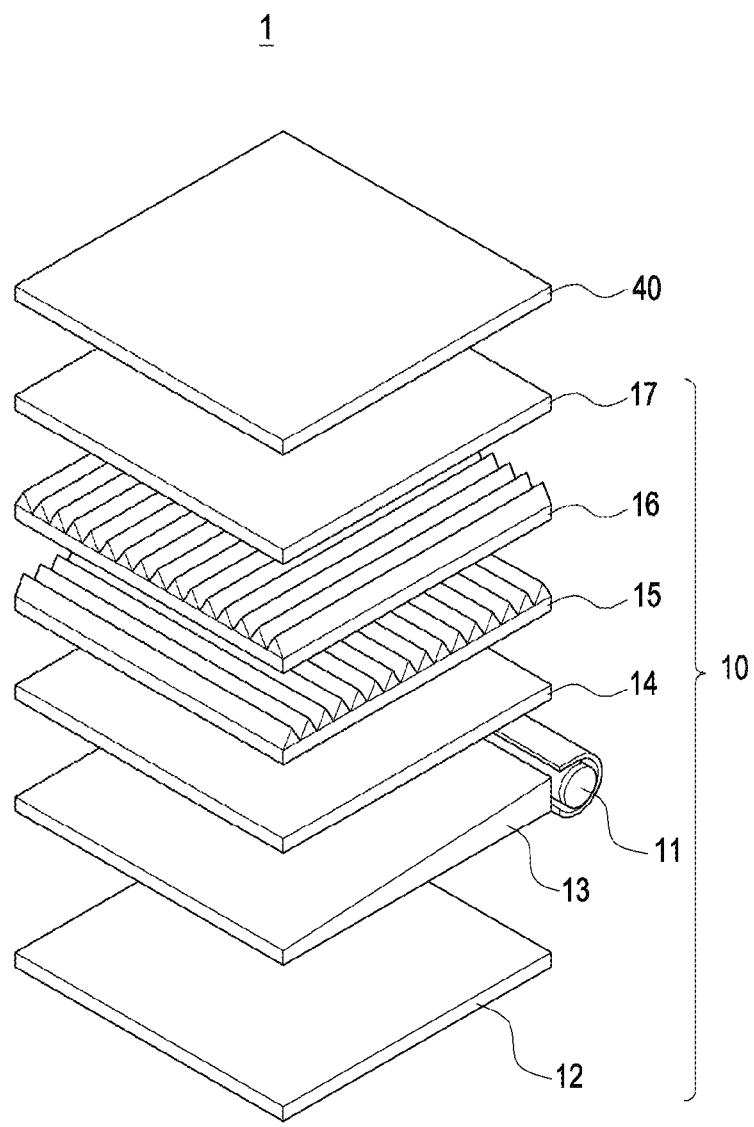
FIG. 1 is a perspective view of a liquid crystal display according to an exemplary embodiment of the present invention.

FIG. 1 is a perspective view of a liquid crystal display according to a preferred embodiment of the present invention.

Referring to FIG. 1, a liquid crystal display (or liquid crystal display (LCD)) (1) includes a backlight unit (10) and a liquid crystal panel (40). In general, the backlight unit (10) may be provided at the rear side of the liquid crystal panel (40) to irradiate light to the liquid crystal panel (40). The backlight unit (10) includes a light source (11), a reflecting plate (12), a light guide plate (13), a diffusion sheet (14), prism sheets (15) and (16), and a reflective polarizer sheet (17).

Light emitted from the light source (11) may be converted into a surface light source by the light guide plate (13). Here, the light source (11) may be an edge type or a direct type. For example, the light source (11) may be a light emitting diode (LED) or a fluorescent lamp.

The reflecting plate (12) is disposed behind the light guide plate (13) to reflect the light emitted to the light guide plate (13) to the light guide plate (13) to minimize the loss of the light.

The diffusion sheet (14) may uniformly diffuse the light incident from the light guide plate (13). A curable resin solution to which light diffusing agent beads are added may be applied to the diffusion sheet (14) to cause light diffusion by the light diffusing agent beads. In addition, the diffusion sheet (14) is formed in a uniform or non-uniform size, for example, a spherical projection pattern or protrusion, to promote diffusion of light.

Here, the curable resin may be one or a mixture of urethane acrylate, epoxy acrylate, ester acrylate and at least one or more of the radical generating monomer.

The prism sheets (15) and (16) may condense incident light by using an optical pattern formed on a surface and may emit the light to the liquid crystal panel (40). The prism sheets (15) and (16) may be formed of an optical pattern layer in which an optical pattern—in the form of a triangular array having an inclined surface of 45°—is generally formed on the light-transparent base film to improve brightness in the front direction.

The reflective polarizing sheet (17) is provided on the prism sheets (15) and (16) so that one polarized light is transmitted to the light collected from the prism sheets (15) and (16) and the other polarized light is reflected downward to recycle the light.

The liquid crystal panel (40) refracts the light emitted from the light source (11) in a predetermined pattern in accordance with the electrical signal. The refracted light passes through the color filter and the polarization filter disposed in front of the liquid crystal panel (40) to form a screen.

Beads may be added to the base film to increase the shielding performance of the diffusion sheet (14). In this case, the shielding performance of the diffusion sheet (14) and the brightness of the light are in a trade-off relationship. That is, when beads are added to the base film of the diffusion sheet (14), the shielding performance of the diffusion sheet (14) is improved, but the brightness of the light may be lowered.

Figure 2:
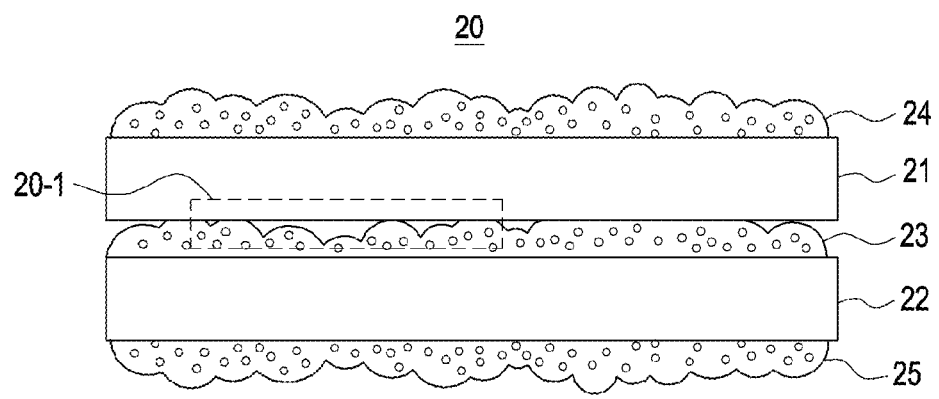
FIG. 2 illustrates a diffusion sheet according to an embodiment of the present invention.
Figure 3:
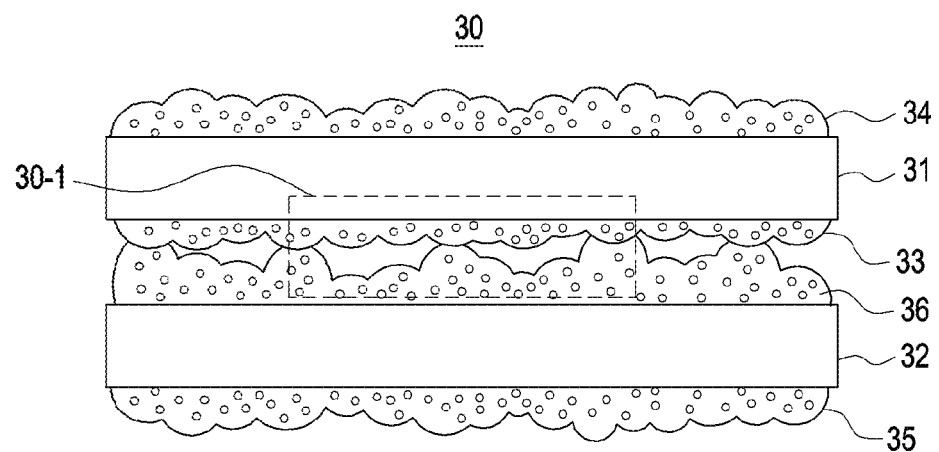
FIG. 3 illustrates a diffusion sheet according to another embodiment of the present invention.

As a method of minimizing a decrease in brightness of light while securing a shielding performance of the diffusion sheet (14), a diffusion sheet (14) comprising a shielding layer formed between a plurality of base films and a plurality of base films is introduced in details through following various embodiments of the present invention with reference to FIGS. 2 and 3.

FIG. 2 illustrates a diffusion sheet according to an embodiment of the present invention.

The diffusion sheet (20) includes the first diffusion layers (21) and (24), the second diffusion layers (22) and (25), and the shielding layer (23). Here, the configuration of the first diffusion layers (21) and (24), the second diffusion layers (22) and (25), and the shielding layer (23) may be defined as a single diffusion sheet.

The first diffusion layers (21) and (24) include a first base film (21) and a first pattern diffusion layer (24).

The second diffusion layers (22) and (25) include a second base film (22) and a second pattern diffusion layer (25).

For example, the first pattern diffusion layer (24) and the second pattern diffusion layer (25) for diffusing light may be formed on one surface of the first base film (21) and the second base film (22). In addition, the first pattern diffusion layer (24) may be formed only on one surface of the first base film (21), or the second pattern diffusion layer (25) may be formed only on one surface of the second base film (22). That is, at least one of the first pattern diffusion layer (24) and the second pattern diffusion layer (25) may be omitted in some cases. In addition, at least one of the first pattern diffusion layer (24) and the second pattern diffusion layer (25) may include beads to enhance light diffusion. In this case, the size of the beads and the content of the beads can be adjusted. For example, the first pattern diffusion layer (24) and the second pattern diffusion layer (25) may be formed of a resin.

The shielding layer (23) can shield shapes, such as a pattern derived from the light guide plate (13), a foreign substance, etc.

The shielding layer (23) may be placed between the first base film (21) and the second base film (22). For example, the shielding layer (23) may be formed of an adhesive. In this case, the adhesive may be a pressure sensitive adhesive (PSA).

The shielding layer (23) can adhere a plurality of diffusion layers. For example, the shielding layer (23) adheres (or bonds) the first diffusion layers (21) and (24) and the second diffusion layers (22) and (25). Alternatively, the shielding layer (23) adheres (or bonds) the first base film (21) and the second base film (22).

The shielding layer (23) may include beads for diffusing light and shield stains, white spots, black spots, and the like from being recognized. In this case, the light irradiated onto the diffusion sheet (20) may be reflected, refracted or diffused by the beads.

The shielding layer (23) diffuses light from at least one of one surface of the first base film (21) and one surface of the second base film (22) and predetermined to shield stains, white spots, black spots, and the like from being visually recognized. It may be arranged or formed in a pattern of. For example, the predetermined pattern may be a spherical shape, a cube shape, a triangular pyramid shape, or the like. For example, the predetermined pattern may be formed regularly or irregularly.

For example, when the shielding layer (23) is placed or formed in a predetermined pattern, the predetermined pattern may include beads. When the predetermined pattern includes a bead, a higher light diffusion rate and improved shielding performance can be expected than when the shielding layer (23) is formed of a pattern only or a simple pattern including a bead.

The brightness of light may be improved when an air gap is secured in the diffusion sheet (20). The air gap may improve the brightness by promoting light diffusion due to the difference in refractive index between the shielding layer (23) and the air.

The predetermined pattern of the shielding layer (23) may be placed such that a predetermined air gap (20-1) is formed between the first base film (21) and the second base film (22).

According to various embodiments of the present invention, the shielding layer (23) having a predetermined pattern may be placed between the first base film (21) and the second base film (22). Here, the thicknesses of the first base film (21) and the second base film (22) may be formed as 16 μm, which is half of the thickness of 32 μm which is the thickness of a general base film including beads to secure a shielding performance. Accordingly, the thickness of the diffusion sheet (20) including the first base film (21) and the second base film (22) may be similar to or the same as the thickness of the general base film.

According to one preferred embodiment of the present invention described above, the diffusion sheet (20) may include at least one of beads and patterns, and may minimize deterioration of brightness while securing a shielding force including an air gap.

As in the above-described embodiment, the shielding layer (23) and the patterned diffusion layers (24) and (25) may include beads. In the following, the characteristic of the beads contained in the shielding layer (23) and the patterned diffusion layers (24) and (25) is described in detail.

The characteristics of the beads can be defined, for example, by the size of the beads and the content (%) of the beads.

For example, the characteristics of the beads included in the shielding layer (23) may be determined based on at least one of a haze value for the diffusion sheet (20), a shielding performance for the diffusion sheet (20), and an adhesion of the shielding layer (23).

For example, the characteristics of the beads included in the patterned diffusion layers (24) and (25) may be determined based on at least one of a haze value for the diffusion sheet (20) and a shielding performance for the diffusion sheet (20).

The haze value defines the diffusivity of the light. The haze value may be defined as in Equation 1 below. Here, the unit of the haze value may be %.

$$\frac{\text{Total Transmittance} - \text{Direct Transmittance}}{\text{Total Transmittance}} \times 100 \qquad \text{Equation 1}$$

Specifically, the diffusion sheet (20) has a haze characteristic. The haze characteristic may be defined as the appearance of an opaque phenomenon (eg, a blur phenomenon) by diffusing light according to the inherent characteristics of the material when passing through the transparent material.

The shielding performance is a degree which shields shapes, such as a pattern derived from the light guide plate (13), and a foreign substance. The higher the shielding performance, the better the shielding shape on the back side. As the shielding performance is higher, the pattern of the light guide plate (13) and the foreign substance are not visually recognized, thereby providing a clean screen to the user. As an example, the shielding performance may be defined in units of %.

The adhesion may be defined as a degree of force to which the first base film (21) and the second base film (22) are bonded. For example, the greater the adhesion, the stronger the first base film (21) and the second base film (22) adhere each other. Here, the unit of adhesion may be defined as kgf (kilogram-force).

FIG. 3 illustrates a diffusion sheet according to another preferred embodiment of the present invention.

Below, detailed descriptions of the same contents as those described above with reference to FIG. 2 will be omitted for the convenience of description.

The diffusion sheet (30) includes first diffusion layers (31) and (34), second diffusion layers (32) and (35), and shielding layers (33) and (36). Here, the first diffusion layers (31) and (34), the second diffusion layers (32) and (35), and the shielding layers (33) and (36) may be defined as a single diffusion sheet. The shielding layer will be described as indicating the shielding layers (33) and (36) for convenience of description, but the shielding layer may be defined as each of the first shielding layer (33) or the second shielding layer (36).

The first diffusion layers (31) and (34) include a first base film (31) and a first patterned diffusion layer (34).

The second diffusion layers (32) and (35) include a second base film (32) and a second patterned diffusion layer (35).

The shielding layers (33) and (36) include a first shielding layer (33) and a second shielding layer (36). Here, the first shielding layer (33) and the second shielding layer (36) may be defined as an adhesive layer or a patterned diffusion layer.

At least one of the first patterned diffusion layer (34) and the second patterned diffusion layer (35) may be omitted in some cases. In addition, at least one of the first patterned diffusion layer (34), the second pattern diffusion layer (35), the first shielding layer (33), and the second shielding layer (36) may include beads to improve light diffusion. In this case, the size of the beads and the content of the beads can be adjusted. For example, the material of the first patterned diffusion layer (34), the second patterned diffusion layer (35), the first shielding layer (33), and the second shielding layer (36) may be resin.

For example, when the first shielding layer (33) is placed on one of one surface of the first base film (31) and one surface of the second base film (32), one surface of the first base film (31) and the second shielding layer (36) may be formed on the other of one surface of the second base film (32). In this case, the first shielding layer (33) is applied to one of one side of the first base film (31) and one side of the second base film (32), and the second shielding layer (36) is the first base film. It may be applied to one of one side of the (31) and one side of the second base film (32).

The diffusion sheet (30) of FIG. 3 is further added with a second shielding layer (36) as compared to the diffusion sheet (20) of FIG. 2, so that the diffusion sheet (30) of FIG. 3 is compared with the diffusion sheet (20) of FIG. 2. The air gap (30-1) may be formed larger. Accordingly, the diffusion sheet (30) of FIG. 3 may further improve the diffusion rate of light than the diffusion sheet (20) of FIG. 2, thereby minimizing the decrease in luminance.

For example, the second shielding layer (36) may include a first protrusion and a second protrusion to secure the air gap (30-1). Here, the height of the first protrusion may be set larger by a predetermined value than the height of the second protrusion. According to this, the second shielding layer (36) may support the first shielding layer (33). Here, since the height of the second protrusion is smaller than that of the first protrusion, an air gap may be larger between the first shielding layer 33 and the second shielding layer (36).

The first protrusion and second protrusion may be made of PMMA (poly methyl methacrylate), a transparent urethane, or resin.

FIGS. 2 and 3, the characteristics of the beads included in the shielding layers (23, 33, and 36), and the characteristics of the beads included in the pattern diffusion layers (24, 25, 34, and 35) may be different from those of the diffusion sheets (20) and (30). It can be set based on the haze value for the diffusion sheets (20) and (30) and the transmittance for the diffusion sheets (20) and (30). Here, the characteristics of the beads may be defined, for example, at least one of the size of the beads and the content (%) of the beads.

When the haze value of the diffusion sheets (20) and (30) is maintained at a high level and the transmittance of the diffusion sheets (20) and (30) is low, the shielding performance may be determined to be excellent. Considering these haze values and transmittance, it is possible to experimentally determine the characteristics of the beads included in the patterned diffusion layer and the shielding layer.

Experimental data for determining the properties of the beads included in the patterned diffusion layer and the shielding layer will be described below with reference to FIGS. 4 to 9.

Figures 4, 5:
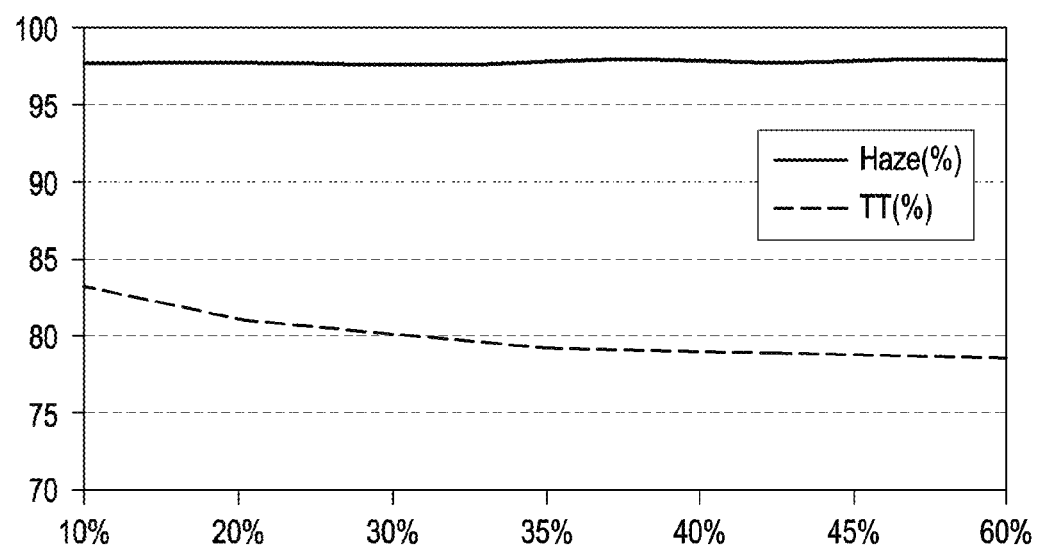
FIGS. 4 and 5 illustrate measured values of haze value and total transmittance according to the particle content of beads according to an embodiment of the present invention.

FIGS. 4 and 5 illustrate measured values of haze value and transmittance according to the particle content of beads according to a preferred embodiment of the present invention.

FIG. 4 shows the measured value of the haze and total transmittance (TT) of the beads when the size of the beads is 80 nm and the content of the beads is 10%, 20%, 30%, 35%, 40%, 45%, and 60%. FIG. 5 is a graph showing the measured value of FIG. 4.

In FIGS. 4 and 5, even though the content of beads increases to 10%, 20%, 30%, 35%, 40%, 45%, and 60%, it is possible to see that while the haze value is relatively constant, but the total transmittance gradually decreases.

Figures 6, 7:
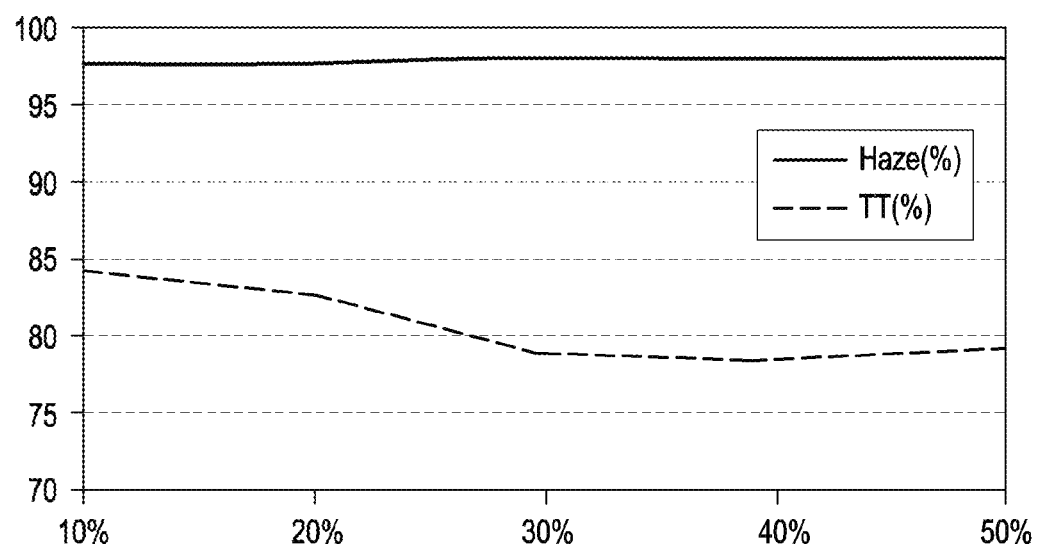
FIGS. 6 and 7 illustrate measured values of haze value and total transmittance according to the particle content of beads according to another embodiment of the present invention.

FIGS. 6 and 7 illustrate measured values of haze value and total transmittance according to the particle content of beads according to another embodiment of the present invention.

FIG. 6 shows the measured values of haze value and total transmittance when the size of the beads is 250 nm and the content of the beads is 10%, 20%, 30%, 40%, and 50%. FIG. 7 is a graph showing the measured value of FIG. 6.

In FIGS. 6 and 7, although the haze value is relatively constant even if the content of the beads increases to 10%, 20%, 30%, 40%, and 50%, the total transmittance decreases according to the content of the beads and then starts from the 30% content. It can be seen that it is relatively constant.

Figures 8, 9:
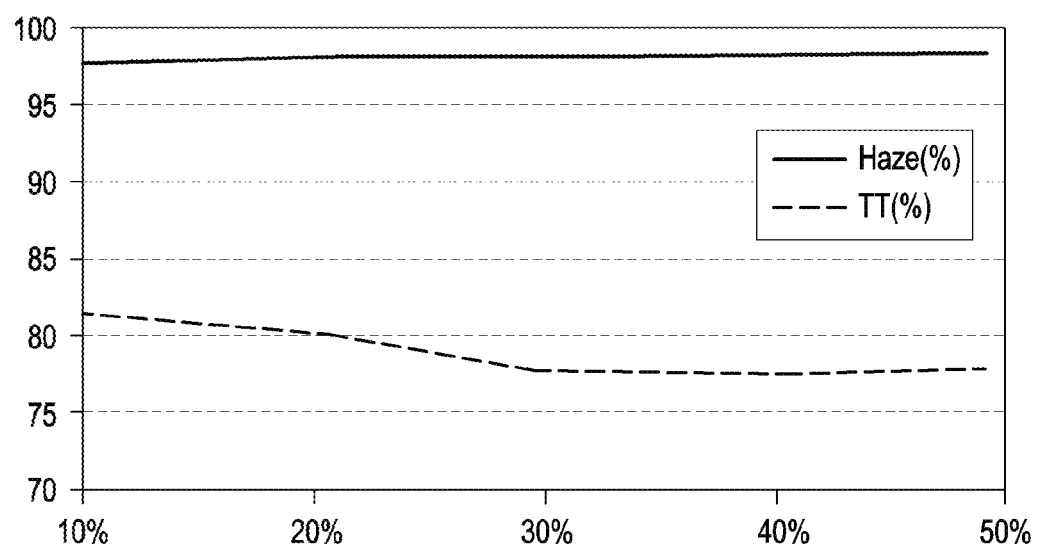
FIGS. 8 and 9 illustrate measured values of haze value and total transmittance according to the particle content of beads according to another embodiment of the present invention.

FIGS. 8 and 9 illustrate measured values of haze value and total transmittance according to the particle content of beads according to another embodiment of the present invention.

FIG. 8 shows measured values of haze value and total transmittance when beads have a size of 500 nm and beads have a content of 10%, 20%, 30%, 40%, and 50%. FIG. 9 is a graph showing the measured value of FIG. 8.

In FIGS. 8 and 9, although the haze value is relatively constant even if the content of the beads increases to 10%, 20%, 30%, 40%, and 50%, the total transmittance decreases according to the content of the beads and then starts from 30%. It can be seen that it is relatively constant.

In FIGS. 4 to 9, the haze value and the size of the total transmittance according to the characteristics of the beads (for example, the size of the beads and the content of the beads) are experimentally measured and included in the patterned diffusion layer based on the results. It is possible to determine the characteristics of the beads to be made.

For example, in the case of FIGS. 4 and 5 (when the size of the bead is 80 nm), the bead having the highest haze value and the lowest total transmittance may be selected as a characteristic of the target bead.

As another example, in the case of FIGS. 6 and 7 (when the size of the beads is 250 nm), the bead characteristics having the highest haze value and the third lowest total transmittance may be selected as characteristics of the beads. Alternatively, the case of the 30% content of the beads starting to converge at a low total transmittance value may be selected as the characteristic of the target beads.

As another example, in the case of FIGS. 8 and 9 (when the size of the bead is 500 nm), the bead may be selected as a characteristic of the bead having the highest haze value and the third lowest total transmittance. Alternatively, the case of the 30% content of the beads starting to converge at a low total transmittance value may be selected as the characteristic of the target beads.

Figures 10, 11:
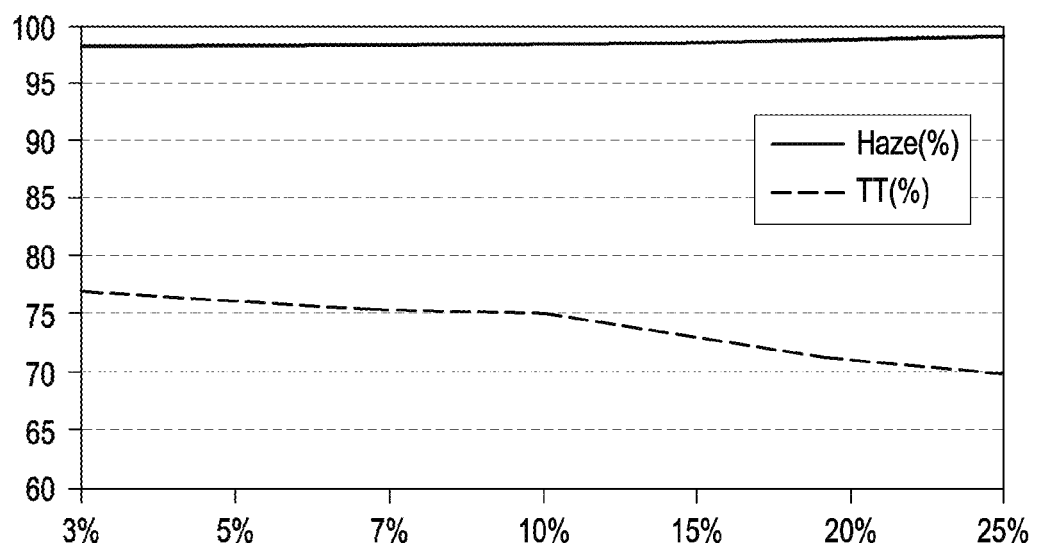
FIGS. 10 to 12 illustrate haze values, total transmittances, and adhesion values according to particle contents of beads included in the shielding layer according to one embodiment of the present invention.
Figure 12:
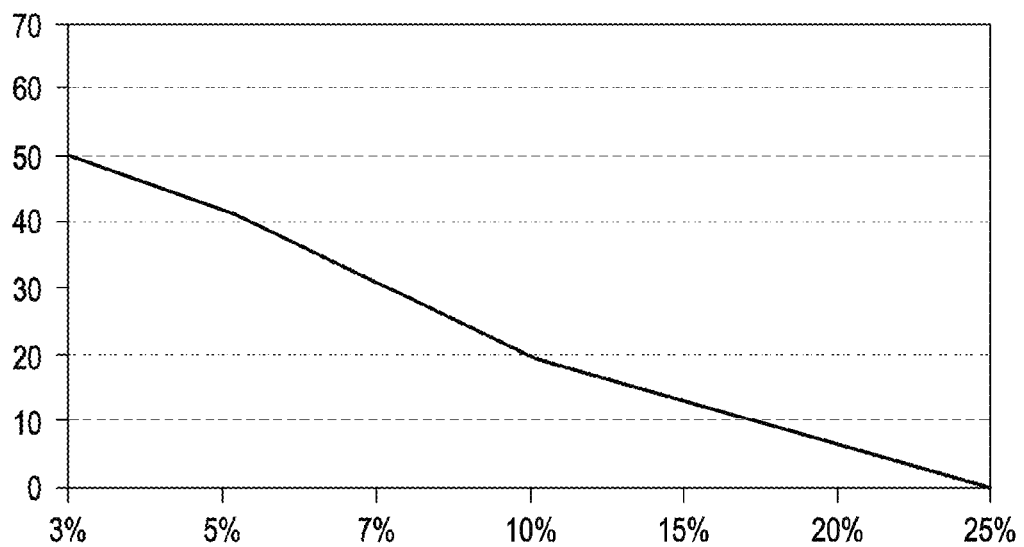

FIGS. 10 to 12 illustrate haze values, total transmittances, and adhesion values according to particle contents of beads included in the shielding layer according to one embodiment of the present invention.

FIG. 10 shows a haze value, total transmittance and adhesion of the beads when the size of the beads included in the shielding layer is 250 nm, the content of the beads 3%, 5%, 7%, 10%, 15%, 20% and 25%.

FIG. 11 is a graph showing measured values of haze value and total transmittance, and FIG. 12 is measured values of adhesion.

The content of the beads which minimizes the brightness deterioration while securing the shielding performance can be determined based on experiments in the case where the total transmittance is low and the adhesion is high while maintaining the haze value at a high level. Here, the higher the adhesion, the greater the binding force between the base films thereby the strength of the diffusion sheet is higher.

Referring to FIGS. 10 to 12 (when the size of the beads is 250 nm), since the haze value in each experimental case is relatively constant at a high level and the total transmittance is relatively constant at a low level, a case of 3% bead content showing the strongest adhesion can be selected as the best bead characteristics.

According to various embodiments of the present invention, an optical film including optimal bead characteristics may be implemented based on a haze value, a total transmittance, and adhesion.

Various embodiments of the present invention described above can minimize the deterioration in brightness while securing shielding performance as compared to a diffusion sheet that adds beads directly to the base film. This can also be confirmed by the experimental result of FIG. 13.

Figure 13:
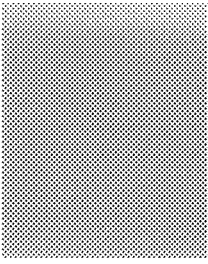
FIG. 13 shows experimental results of diffusion sheet performance according to an embodiment of the present invention.
Figure 13:
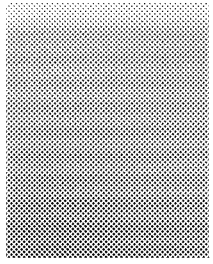
Figure 13:
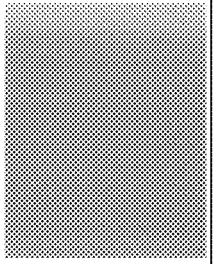

FIG. 13 shows experimental results of diffusion sheet performance according to an embodiment of the present invention.

Specifically, the haze value, total transmittance, brightness, color coordinates, and appearance of the prior art (1310) and the various embodiments (1320) of the present invention are illustrated. Here, in various embodiments of the present invention (1320) includes a case in which the first shielding layer is included in the diffusion sheet (in the case of the diffusion sheet (20) of FIG. 2), and the other case where the first shielding layer and the second shielding layer are included in the diffusion sheet (in the case of diffusion sheet (30) of FIG. 3).

Referring to FIG. 13, the haze value shows a high level in the case of the prior art (1310) and the case of various embodiments (1320) of the present invention. The total transmittance shows an acceptable level in the case of the prior art (1310) and the case of various embodiments (1320) of the present invention, it can be seen that the shielding performance is secured in any case. The brightness of the various embodiments of the present invention (1320) shows a higher level approaching 100% than in the case of the prior art (1310).

Two base films used for the diffusion sheet (1320) according to a preferred embodiment of the present invention may have a thickness less than half the thickness of the base film used for the diffusion sheet (1310) of the prior art. Through this, the diffusion sheet (1320) according to an embodiment of the present invention can maintain the same or similar thickness as the diffusion sheet (1310) of the prior art, while minimizing the decrease in luminance and ensuring excellent shielding force.

Here, when the diffusion sheet (1320) of the present invention includes only the first shielding layer, the thickness of the diffusion sheet may be thicker than that of the diffusion sheet (1320). For example, the diffusion sheet including only the first shielding layer may be formed to a thickness of 32 μm to 34 μm, and in the case of the diffusion sheet including the first and second shielding layer, a thickness of 32 μm to 36 μm can be formed.

As described above, while the embodiments of the present invention have been shown and described, it is understood that various changes in form and details may be made by one ordinary skilled in the art without departing from the spirit and scope of the present embodiment as defined by the claims and their equivalents.

What is claimed is:
1. A diffusion sheet comprising:
a first base film;
a second base film; and
a shielding layer placed between said first base film and said second base film, wherein said shielding layer includes beads and forms an air gap,
wherein the diffusion sheet further comprises:
a first patterned diffusion layer formed one side of said first base film; and
a second patterned diffusion layer formed one side of said second base film.
2. The diffusion sheet of claim 1,
wherein at least one of said first and second patterned diffusion layers further includes said beads.
3. The diffusion sheet of claim 1,
wherein a characteristic of said beads is determined by at least one value based on a haze value of said diffusion sheet, a transmittance of said diffusion sheet, or an adhesion of said shielding layer.
4. The diffusion sheet of claim 2,
wherein a characteristic of said beads is determined by at least one value based on a haze value of said diffusion sheet or a transmittance of said diffusion sheet.
5. The diffusion sheet of claim 1, wherein
the shielding layer placed between said first base film and said second base film defines a first shielding layer, and the diffusion sheet further includes a second shielding layer formed between said first base film and said second base film.

6. The diffusion sheet of claim 5, wherein said second shielding layer is formed one side of said first shielding layer.

7. The diffusion sheet of claim 5, wherein said second shielding layer includes a first protrusion and a second protrusion, and
wherein each said first protrusion and said second protrusion has a different height.

8. The diffusion sheet of claim 7, wherein a height of said first protrusion is larger than a height of said second protrusion to provide a contact with said first shielding layer and said second shielding layer.

9. A diffusion sheet comprising:
a first base film;
a second base film; and
a shielding layer placed between said first base film and said second base film, wherein said shielding layer includes beads and forms an air gap,
wherein a thickness of said diffusion sheet is between 32 µm and 36 µm.

10. A backlight unit comprising:
a diffusion sheet including a first base film;
a second base film; and
a first shielding layer placed between said first base film and said second base film, wherein said first shielding layer includes an air gap and a pattern,
wherein the diffusion sheet further includes:
a first patterned diffusion layer formed one side of said first base film; and
a second patterned diffusion layer formed one side of said second base film.

* * * * *